United States Patent [19]

Eichenauer

[11] Patent Number: 4,648,777

[45] Date of Patent: Mar. 10, 1987

[54] CONVEYOR COMPRISING A RUNWAY RAIL AND CRAB

[75] Inventor: Karl-Friedrich Eichenauer, EV Soest, Netherlands

[73] Assignee: Branson Ultrasonics Corporation, Danbury, Conn.

[21] Appl. No.: 704,661

[22] Filed: Feb. 25, 1985

[30] Foreign Application Priority Data

Jun. 1, 1984 [EP] European Pat. Off. ........ 84106286.2

[51] Int. Cl.$^4$ .............................................. B66C 7/08
[52] U.S. Cl. .................................. 414/591; 414/751; 104/89; 212/140
[58] Field of Search ................... 104/89, 93, 107, 110; 414/591, 749, 751; 212/140, 141, 205; 198/838, 845; 105/153, 150

[56] References Cited

U.S. PATENT DOCUMENTS

| | | | |
|---|---|---|---|
| 3,018,739 | 1/1962 | Carroll | 104/93 X |
| 3,092,039 | 6/1963 | Lich | 105/150 |
| 3,525,306 | 8/1970 | Edel et al. | 104/107 X |
| 3,774,778 | 11/1973 | Flaig | 414/591 |
| 4,000,702 | 1/1977 | Mackintosh | 104/89 X |
| 4,208,619 | 6/1980 | Delebecque et al. | 414/749 X |
| 4,402,173 | 9/1983 | Thieron | 414/591 X |
| 4,445,502 | 5/1984 | Swan et al. | 104/89 X |
| 4,520,733 | 6/1985 | Willmann | 105/150 X |

FOREIGN PATENT DOCUMENTS

| | | |
|---|---|---|
| 2343502 | 4/1975 | Fed. Rep. of Germany . |
| 2716453 | 4/1977 | Fed. Rep. of Germany . |
| 2645883 | 6/1977 | Fed. Rep. of Germany . |
| 2709208 | 9/1977 | Fed. Rep. of Germany . |
| 2718640 | 11/1978 | Fed. Rep. of Germany . |
| 1418385 | 10/1965 | France . |
| 2336287 | 7/1977 | France . |
| 2048806 | 12/1980 | United Kingdom . |

*Primary Examiner*—Robert J. Spar
*Assistant Examiner*—D. Glenn Dayoan
*Attorney, Agent, or Firm*—Ervin B. Steinberg; Philip J. Feig

[57] ABSTRACT

A conveyor system comprises a runway rail in the form of an extruded hollow body of oblong cross-section. The runway rail has a top portion which includes a pair of parallel surfaces including between them an angle. A similar pair of parallel surfaces is disposed at the bottom portion of the runway rail, which surfaces are parallel to respective surfaces of the top portion and include the same angle. A crab having load and guide wheels is disposed on the runway rail, the load wheels engaging the pair of surfaces at the top portion and at least one guide wheel engaging one of the surfaces at the bottom portion. A driving motor mounted to the lateral flange of the crab is adapted to drive the crab along the runway rail by engaging a stationary drive element mounted to a side rail of the runway rail. A hoist mounted to the crab serves to raise and lower work pieces. The runway rail can be strengthened by mounting two runways in abutting relationship, one above the other, or by inserting a square tubing into the hollow body.

7 Claims, 4 Drawing Figures

CONVEYOR COMPRISING A RUNWAY RAIL AND CRAB

BRIEF BACKGROUND OF THE INVENTION

This invention relates to a conveyor comprising a stationary mounted runway rail and a crab having load and guide wheels for conveying workpieces along the rail.

Conveying systems based on a wide variety of designs are used in many sectors of technology to convey goods which may take the form of individual parts or baskets for holding a plurality of such parts. For instance, it is known to use a frame having a runway rail and a crab for transporting mechanically or chemically treated parts which are often disposed in bins or baskets. The unsupported length of the runway rail must span the total distance of conveyance. The crab has a hoist for raising and lowering the workpieces.

Conveyors of this kind usually have a runway rail of rectangular cross-section on which a crab is disposed for longitudinal motion by means of load and guide wheels extending from the crab. Conveyors of this kind are disclosed, for instance, in German patent application DE-OS Nos. 27 18 640 and 27 09 208.

Conveyors of the known type have significant disadvantages. The cross-section of the material used for the rail must be dimensioned by taking into account both the load to be carried and the length to be spanned. Consequently, the runway rail may be oversized when the loads to be carried are relatively light or the lengths to be spanned are relatively short. Also, as shown in German OS No. 27 09 208 it is known to utilize a series of individual rail portions, one after another in a unit type construction, for providing conveyor distances of different lengths. A disadvantage of this latter construction resides in the fact that each individual portion must have a cross-section suitable for the maximum length and the maximum load.

Rectangular cross-sections of the known conveyors fail to provide accurate guidance for the crab. Accurate crab motions in the direction along the rail and transversely thereof are essential when microprocessors are used for controlling such motions as is the case, for instance, in ultrasonic cleaning installations.

The crab must be positioned accurately for this particular use. In known conveyors, such as can be seen in German OS No. 23 43 502, the crab is driven by means of a load wheel friction drive. This kind of drive is not suited for accurate positioning. Other friction drives are known which use drive belts, for instance German OS No. 26 45 883. Friction drives are used frequently when abrupt and jerky changes of motion are to be avoided. Clearly, a crab cannot be accurately positioned by means of the above stated drives unless further adjustment means are provided.

It is a principal object of this invention to provide a conveyor which can be adapted economically to required loadings and spans.

Another important object of this invention is the provision of a conveyor system in which the crab motion is controlled with a high degree of precision.

Other objects and advantages of the present invention will become more clearly apparent by reading the following description in conjunction with the accompanying drawings.

DETAILED DESCRIPTION OF THE INVENTION

Figure 1:
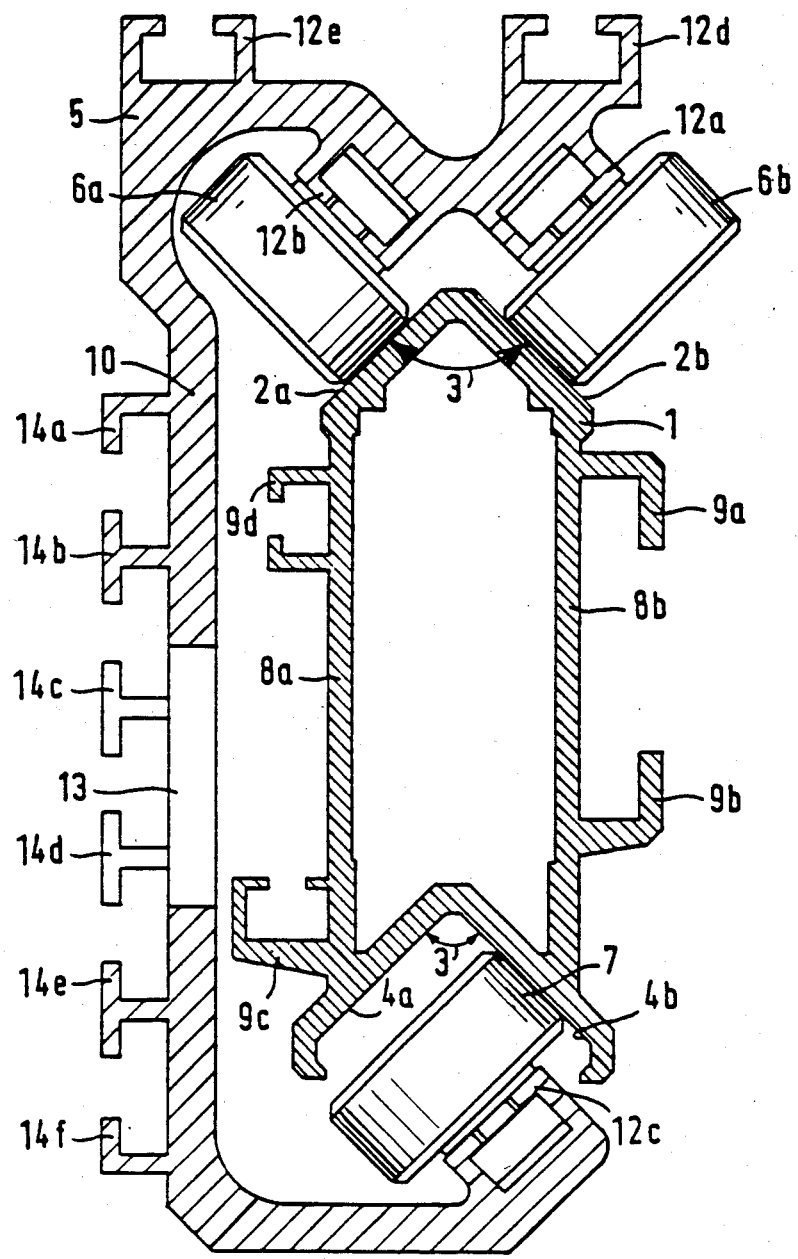
FIG. 1 is a cross-sectional view of the runway rail with a crab disposed thereupon.

FIG. 1, a typical embodiment, depicts in cross-section a runway rail 1 with a crab 5 disposed thereupon. The rail 1 is an extruded hollow body of oblong cross-section and exhibits on its load carrying top portion two plane surfaces 2a and 2b serving respectively as a first track and a second track. The surfaces 2a and 2b include between them a "roof angle" of preferably 90 degrees. Respective side flanges 8a, 8b descend from the top portion of the rail and carry the bottom portion of the rail 1, which includes two second plane surfaces 4a, 4b, the surface 4b serving as third track. The bottom two surfaces 4a, 4b include between them the same angle 3 as the top two surfaces 2a, 2b. Also, surfaces 4a and 2a are parallel to one another and surfaces 4b and 2b are parallel to one another. The flanges 8a, 8b have outer rails 9a to 9d. These rails can be T-shaped or dovetailed or, as shown in FIG. 1, extend around a rectangle in order to receive nuts or screws or other fastening elements.

As seen in FIG. 1, the crab 5 disposed on the runway rail 1 is provided internally at its top portion with two mounting rails 12a, 12b and inside its bottom portion with another mounting rail 12c. The mounting rails 12a, 12b, 12c are so disposed that screws inserted are positioned parallel to the surfaces of the surfaces 2a, 2b and 4b of the tracks of the rail 1 and thereby perpendicularly to the span of the tracks. Load wheels 6a, 6b of the crab 5 are mounted within the top mounting rails 12a, 12b. The number of load wheels used by the crab depends upon the load to be carried by the crab 5. At least one guide wheel 7 is mounted within the bottom mounting rail 12c and bears upon the surface 4b. In the preferred embodiment, a set of two wheels engages each surface 2a, 2b and 4b. The crab 5 has only one lateral flange 10 and, therefore, is open on the opposite side. The flange 10 includes outer assembly rails 14a to 14f which extend longitudinally parallel to the mounting rails 12a, 12b and 12c.

The crab 5 is so disposed on the runway rail 1 as to roll therealong by means of its load wheels 6a, 6b. Because the tracks are disposed at the angle 3 of preferably 90 degrees to one another and because the correspondingly disposed load wheels in connection with the bottom track 4b are disposed at the same angle 3 with the corresponding guide wheels 7, the crab 5 runs in a very smooth manner, without play, and with the capability of accurate alignment and self-adjustment, thus providing accurate rolling motion of the crab 5 along rail 1.

Figure 2:
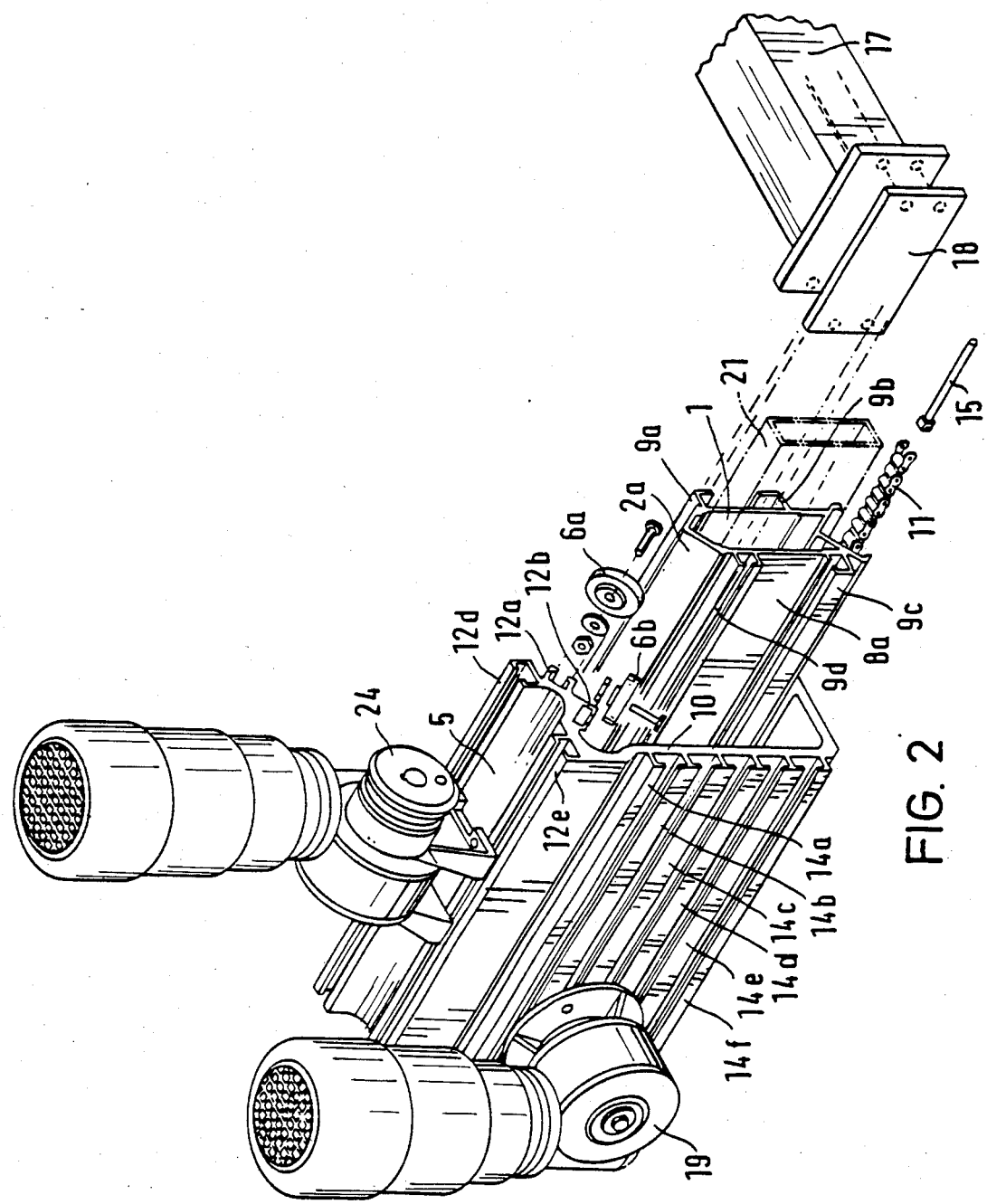
FIG. 2 is a perspective view of the runway rail together with the crab, a roller chain used as a spur rack, a driving motor and a cross-member as part of the support structure for the conveyor.

As seen in FIG. 2, the rails 9a, 9b of the flange 8b of the rail 1 are used for fastening the runway rail 1, for instance, to a cross-member 17. Suitably manufactured mounting hardware 18 can be used for this purpose. The rail 9c can be used to receive in its channel a drive element, such as a stationary roller chain 11. A roller chain secured in a channel of this rail is less expensive than, for instance, a stationary toothed rack, and can be adapted for any length. Known elements 15 serve to tension the chain 11.

Lateral flange 10 of crab 5 is provided with an aperture 13 as seen in FIG. 1. A motor-driven pinion or gear (not shown in the drawings) extends through the aperture 13 and engages the chain 11. The crab 5 can therefore be motor-driven along the runway rail 1. Preferably, the motor 19 is rigidly secured to the crab 5 by means of the assembly rails 14a, 14f disposed along the flange 10 of crab 5. This drive, according to the invention, has the advantage that the crab can be positioned very accurately, since there is a constant relationship between the pinion position of the motor and the chain links, a feature which is lacking in the case of a friction drive. At the top, the crab 5 is provided with outwardly extending mounting rails 12d, 12e for enabling a hoist 24 for workpieces to be mounted upon the crab 5.

FIG. 2 shows that a rectangular tube 21 can be inserted into the hollow interior of the extruded rail 1. The tube 21 provides strengthening of the rail 1 when long spans or heavy loads are encountered.

Figure 3:
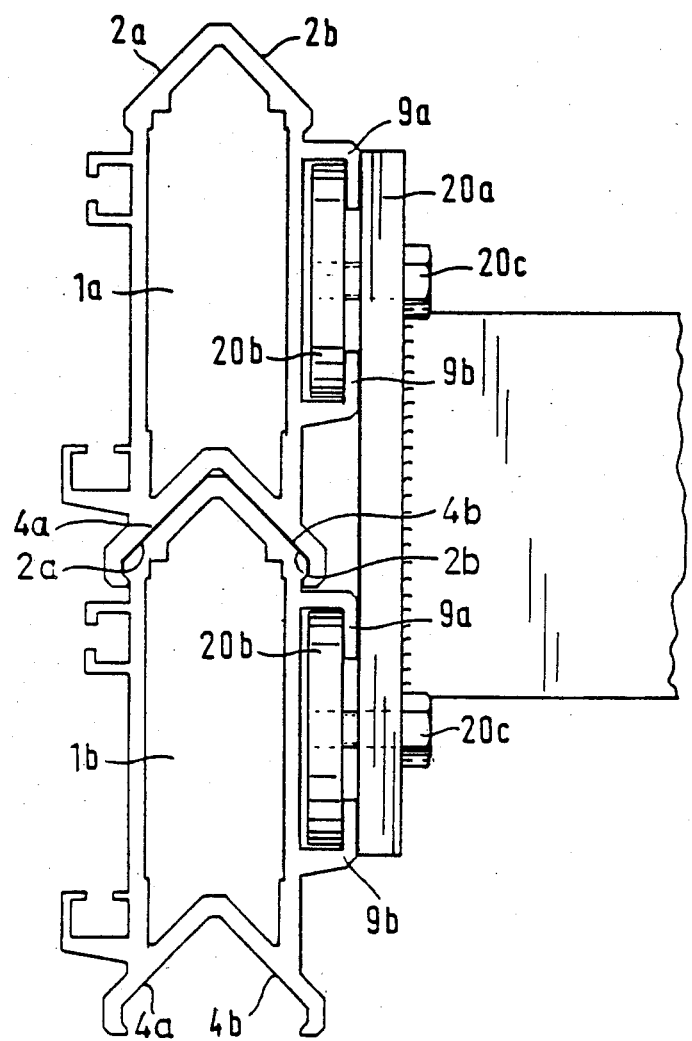
FIG. 3 is an end view of the runway rail using the unit construction principle.

FIG. 3 shows another or alternative method of strengthening. The cross-sectional shape of the rail 1 has the advantage of enabling two or more runway rails 1a, 1b to be mounted one above the other using the unit construction principle. Preferably, the rails 9a and 9b are used for securing the runway rails 1a, 1b in assembled relationship. The necessary fastening means have the reference designations 20a, 20b, 20c in FIG. 3. This kind of rail strengthening requires merely a crab having a vertically lengthened flange 10. The upper track surfaces 2a and 2b of the lower runway rail 1b are in contact with the lower track surfaces 4a and 4b of the upper runway rail 1a.

The conveyor according to the invention is useful quite particularly for conveying workpieces from a pickup table to a first working position, from the latter position to other working positions and finally to a delivery table, the hoist 24 mounted to the crab being adapted to raise or lower the workpieces in the vertical direction.

Figure 4:
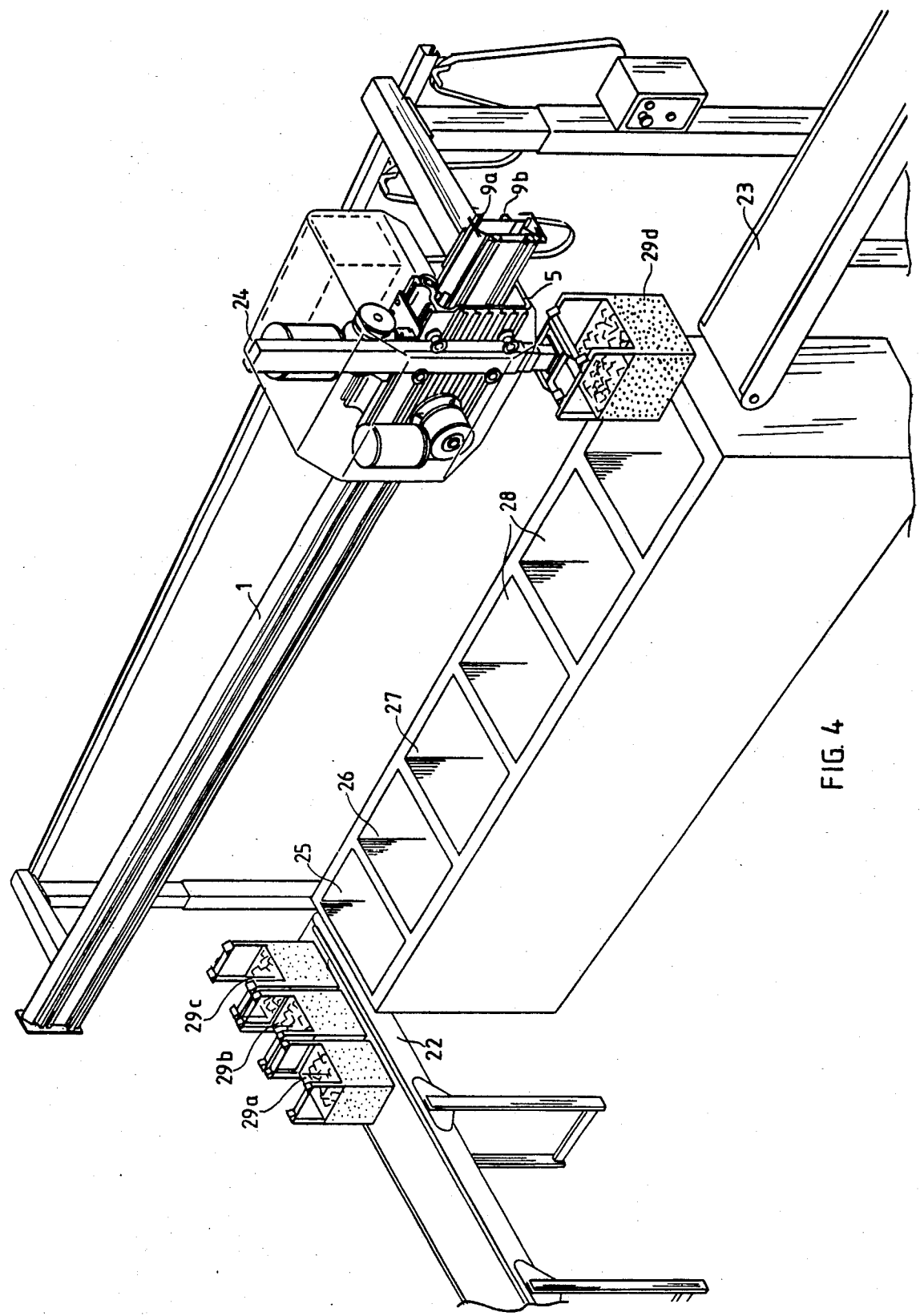
FIG. 4 shows, by way of example, the conveyor used in conjunction with an ultrasonic cleaning installation.

FIG. 4 shows the use of the conveyor according to the invention in connection with an ultrasonic cleaning facility. In FIG. 4 there can be seen a pickup table 22, a delivery table 23 and several working positions, i.e., cleaning baths in the present case 25 to 28, and baskets 29a, 29b, 29c and 29d. The runway rail 1 with crab 5 is mounted in horizontal position above the cleaning baths and the rail 1 is supported by securing the rails 9a and 9b to a stationary frame.

In applications as shown in FIG. 4 the crab must be guided accurately and without backlash and must be positioned with a high degree of precision. The converyor according to the present invention meets these requirements. Also, the load capacity of the converyor, and the distance it can span, can be adapted economically to suit different requirements by using two or more rails disposed one above the other and/or by strengthening the hollow rail internally with rectangular tubes. Hence, no major constructional modifications become necessary.

While there have been described and illustrated several preferred embodiments of the present invention and various other changes have been indicated, it will be apparent to those skilled in the art that further changes and modifications may be made without departing from the spirit of the invention, which shall be limited only by the scope of the appended claims.

What is claimed is:

1. A conveyor system including a stationary supported runway rail supporting a crab having load wheels and guide wheels, said crab adapted to transport workpieces along said runway rail comprising:

said runway rail including a first rail being in the form of a hollow extruded body having longitudinally extending along its top portion a first outer plane surface and a second outer plane surface serving as respective tracks for load wheels of said crab, said first and second surfaces being angled relative to one another including therebetween a roof angle;

a third outer plane surface and a fourth outer plane surface disposed at the bottom portion of said first rail and extending longitudinally therealong and connected to said top portion of said first rail by respective first and second side flanges;

a second rail in the form of a hollow extruded body of the same configuration as said first rail disposed one above the other in a manner that the first and second outer plane surfaces of the lower rail are in contact with the respective third and fourth plane surfaces of the upper rail, at least one of said third or fourth surfaces of the lower rail serving as a track for a guide wheel of said crab, said third and fourth surfaces being disposed parallel to said respective first and second surfaces of the upper rail and including therebetween said roof angle;

a set of at least three load wheels coupled to said crab for supporting said crab on said first and second surfaces of the upper rail;

a lateral flange depending from an upper portion of said crab toward the bottom portion of said runway rail, and a guide wheel coupled to said lateral flange of said crab for supporting said crab also on one of said third or fourth surfaces of the lower rail, and both said first and second rails being fastened to a cross member by respective first side flanges.

2. A conveyor system as set forth in claim 1, at least one of said second side flanges of said runway rail including an outer rail extending longitudinally therealong, said outer rail being adapted to house a drive element for said crab.

3. A conveyor system as set forth in claim 2, said drive element comprising a stationary roller chain.

4. A conveyor system as set forth in claim 1, said crab including a set of mounting rails for mounting said load and guide wheels.

5. A conveyor system as set forth in claim 2, said lateral flange of said crab having a set of assembly rails for supporting a drive motor, an aperture disposed in said lateral flange for causing drive means of said motor to extend therethrough for engaging said drive element disposed in said outer rail.

6. A conveyor system as set forth in claim 5, said crab including a hoist for lifting and lowering workpieces conveyed by said crab.

7. A conveyor system as set forth in claim 1, said roof angle being substantially ninety degrees.

* * * * *